3,310,534
NYLON COMPOSITION HAVING ENHANCED DYEABILITY
Edmond P. Brignac, Pensacola, and Robert T. Wright, Pensacola Beach, Fla., assignors to Monsanto Company, a corporation of Delaware
No Drawing. Filed Sept. 12, 1963, Ser. No. 308,340
2 Claims. (Cl. 260—78)

This invention relates to the preparation of nylon polymers having enhanced ability to receive dyes. More particularly, this invention relates to nylon-66 type polymer containing additives which render the polymer more receptive to dyes and to a method of shaping such polymer into textile structures and the like.

Yarns made from nylon-66 polymers have gained wide acceptance in the textile trade because of their many desirable physical properties. As is well known, nylon-66 is commercially prepared by polycondensing adipic acid and hexamethylenediamine. The resulting polymer does not have as good a dye affinity as some of the other specific nylon polymers, such as nylon-6. Therefore, in order to increase the utility of nylon-66 as a more general purpose filamentary material, much reserach effort has been conducted to improve the affinity of nylon-66 polymer both from the standpoint of depth of dyeing and from the standpoint of rate of dyeing.

It has been disclosed previously that phenylphosphinic acid and certain derivatives thereof render nylon-66 more deeply dyeable such that it dyes at least to the same depth to which nylon-6 is dyeable. However, the rate at which nylon-66 containing the phosphinic acid additive proceeds to dye to a given depth is not satisfactory. That is to say, that while nylon-66 containing the phosphinic acid additive is dyeable to a satisfactory depth, it does not dye at the speed required in certain commercial dyeing processes, such as the pad dyeing technique used to color nylon webbing for use in the construction of safety belts and the like.

It is an object of the present invention to provide a new and useful nylon polymer having improved depth of dyeing and accelerated rate of dyeing.

It is another object to provide a new and useful nylon-66 type polymer having improved dyeability by the presence therein of a combination of additives.

It is a further object to provide a structure shaped from a nylon-66 type polymer having increased dye affinity by the presence therein of a combination of additives.

It is yet another object to provide a method of preparing a nylon-66 type polymer capable of being dyed deeper and more quickly.

It is still another object to provide a method of preparing deeper and more quickly dyeable nylon-66 type textile yarn.

The objects of this invention are accomplished by incorporating in nylon-66 forming reactants a particular dye-enhancing combination of additives. The combination comprises a small amount of N-aminoethyl piperazine, particularly N-(2-aminoethyl) piperazine and a relatively larger amount of 6-aminocaproic acid. The nylon is prepared by forming a mixture of a nylon forming monomeric component and the particular dye-enhancing combination of additives, and by thereafter heating the resulting mixture at nylon-forming temperatures for a sufficient time to polycondense the nylon-forming component to the desired degree of polycondensation. The nylon-forming component ordinarily is the salt of hexamethylenediamine and adipic acid. The resulting nylon-66 type polymer is worked or shaped into textile structures or the like by conventional procedures.

The amount of N-(2-aminoethyl) piperazine incorporated in the nylon polymer is usually about 0.2–2.0 percent, based on the weight of the nylon. By employing the piperazine compound in an amount much below 0.2 percent, one does not obtain the desired increase in dye-depth of the polymer. Not substantially exceeding 2.0 percent enables one to avoid certain difficulties encountered in spinning polymer containing the piperazine compound into filament. Among such difficulties is the great increase in the incidence of spinnerets drips. A preferred concentration of the piperazine compound is in the range of 0.2–1.0 weight percent.

The amount of caprolactam added to the nylon-forming mixture generally will be about 3.0–20 percent based on the weight of the polymer. The preferred amount of caprolactam is in the range of 5.0–15 weight percent. By employing caprolactam in an amount much below 3.0 percent, one does not obtain the desired increase in the rate of dyeing of the polymer. Not using caprolactam in the formulation in excess of 20 percent enables one to retain substantially the desirable properties inherent in unmodified nylon-66 polymer.

The most useful polymers of the present invention are high molecular weight material having an intrinsic viscosity of 0.4 or above. The high molecular weight nylon having an intrinsic viscosity of 0.7–1.3 advantageously can be formed into textile-grade filaments, fibers, films and the like.

Intrinsic viscosity can be ascertained by first determining the specific viscosities of a series of solutions of the nylon polymer. Then, these data are plotted on a graph and the intrinsic viscosity calculated therefrom. Specifically, a series of polymer solutions are prepared in concentrations, for example, of 0.1, 0.2, 0.3, 0.4 and 0.5 percent by weight. A 100 series viscometer tube is used; and the efflux time in seconds at 25° C. is determined for each solution and the solvent employed. Specific viscosity is then determined as follows:

$$N_{sp} = \frac{\text{efflux time of solution}}{\text{efflux time of solvent}} - 1$$

A graph is made in which $N_{sp}$/percent concentration is plotted against percent concentration. A straight line is drawn through the points. By extrapolating the line to zero concentration, the intrinsic viscosity is determined, i.e., the point at which the extrapolated line crosses the $N_{sp}$/percent concentration axis is taken as the intrinsic viscosity.

The combination of dye-enhancing additives can be incorporated in the nylon-66 composition in various ways. One preferred way is to admix the ingredients of the combination of additives with nylon-66 salt before polycondensation commences. However, incorporation of the additives together or separately to the nylon-forming material at any time during polycondensation can be made.

The nylon polymer having the combination of dye-enhancing additives incorporated therein can be shaped or worked into various forms. For example, the polymer can be melt spun into yarns, bristles, filaments, films and the like. Articles can be molded from the nylon; and surfaces can be coated therewith.

For a more detailed description of the present invention, reference is made to the following specific examples. The examples are intended to be illustrative and not limitative. All parts and percentages used therein are by weight unless otherwise indicated.

Example I

An aqueous solution of 40 percent N-(2-aminoethyl) piperazine and an aqueous solution of 50 percent 6-aminocaproic acid were prepared.

A stainless steel autoclave adapted for batch polycondensation of nylon-66 was filled with nitrogen gas and was thereafter charged with an aqueous solution containing 75 percent by weight of the adipic acid salt of hexamethylenediamine (nylon-66 salt). The aqueous solution also contained caprolactam in an amount that the ultimate polymer was composed of 3.0 percent thereof. The temperature of the charge was 138° C., and the pressure in the autoclave was 25 p.s.i.g. Immediately after the salt charge was completed an amount of the prepared piperazine was added to the autoclave such that the ultimate polymer had 0.38 percent additive.

The contents in the autoclave then were heated quickly to a temperature of 243° C. under 250 p.s.i.g. pressure. At this stage bleeding off of water in the autoclave was begun as the pressure therein was reduced to atmospheric pressure. These conditions were maintained until the nylon melt temperature was 275° C. and polymer was formed having fiber-forming properties. Upon completion of the polycondensation reaction, the polymer was extruded in the form of a ribbon onto a casting wheel where it was quenched with water. Thereafter, the ribbon was cut into chips suitable for forming into filaments by use of a heated grid spinning apparatus.

The nylon chips containing the additives were then melted in a steam atmosphere in a grid spinning apparatus and spun by conventional melt spinning into a 4300 denier 136 filament yarn at a takeup rate of 300 y.p.m. This yarn was then drawn to 840 denier in the usual manner.

Example II

Filaments were produced in the same manner described in Example I. However, in this instance neither N-(2-aminoethyl) piperazine nor caprolactam was added to the nylon formulation. In other words, unmodified nylon-66 filaments were made.

Example III

Comparative dyeings were conducted on laboratory tapes of standard construction woven from the filaments of the above examples.

Dyebaths containing 0.25 percent Anthraquinone Blue to 150 ml. of water per gram of fabric were prepared. The temperature of the dyebath was raised to boil at which time the samples to be dyed were placed therein. The baths were held at this temperature for the period of time indicated in the table below. The first set of data in the table represents the results obtained with the tapes woven from the additive containing nylon polymer of Example I; and the second set of data represents the results obtained with the tapes woven from unmodified nylon-66 polymer of Example II. For convenience the heading of the first set of data is presented as "Test Filaments"; and the heading of the second set of data is presented as "Control Filaments." The percent dye absorbed and the percent exhaust of the baths were determined for each tape dyed. In the column captioned "Percent Dye Absorbed" the data for the given dyeing tests denote that the 0.25 percent Anthraquinone Blue has been reduced to the percent indicated. In the column captioned "Percent Exhaust," the data indicates on a weight basis the percentages of the dye in the dyebaths which had been removed therefrom by the fabric at a given time. The following results were obtained.

TABLE.—TEST FILAMENTS

| Time at Boil | Percent Dye Absorbed | Percent Exhaust |
|---|---|---|
| Seconds: | | |
| 0 | | |
| 20 | 0.01 | 4.0 |
| 40 | 0.02 | 8.0 |
| Minutes: | | |
| 1 | 0.03 | 12 |
| 2 | 0.07 | 28 |
| 5 | 0.17 | 68 |
| 10 | 0.23 | 92 |
| 20 | 0.24 | 96 |
| 30 | 0.24 | 96 |
| 60 | 0.24 | 96 |

CONTROL FILAMENTS

| Time at Boil | Percent Dye Absorbed | Percent Exhaust |
|---|---|---|
| Seconds: | | |
| 0 | | |
| 20 | 0.01 | 4.0 |
| 40 | 0.01 | 4.0 |
| Minutes: | | |
| 1 | 0.01 | 4.0 |
| 2 | 0.01 | 4.0 |
| 5 | 0.06 | 24 |
| 10 | 0.14 | 56 |
| 20 | 0.17 | 68 |
| 30 | 0.18 | 72 |
| 60 | 0.20 | 80 |

From the foregoing data it is seen that nylon filaments made of polymer prepared by polycondensing nylon-66 salt in the presence of a small amount of N-(2-aminoethyl) piperazine and a relatively large amount of caprolactam exhibit a faster dyeing rate with acid dye to a greater depth, as compared with similar filaments which do not contain these additives.

Example IV

Filaments were prepared from unmodified nylon-66 polymer of Example II. A second type of filaments was prepared from nylon-66 salt to which 0.75 weight percent N-(2-aminoethyl) piperazine on the polymer weight basis had been added just prior to polycondensation. A third type of filaments was prepared from nylon-66 salt to which 0.75 weight percent N-(2-aminoethyl) piperazine and 12 weight percent 6-aminocaproic acid had been added just prior to polycondensation in accordance with the present invention. Comparative dyeing on woven tapes were made from these three different types of filaments. The dyebaths used contained 16 percent Cibalan Yellow GRL in 40 volumes of water, the percentage being based on the weight of fabric to be dyed. The baths were brought to boil and the fabrics were then inserted into separate baths for 60 minutes. The percent dye absorbed after such time was determined for each bath. It was found that the fabric made of nylon-66 with no additives had absorbed only 4–5 percent; that the fabric made of nylon-66 with the small amount of N-(2-aminoethyl) piperazine absorbed only 7–8 percent; but that the fabric made of the nylon of the present invention absorbed 15.2–15.8 percent.

Similar improvements were found when nylon-66 type polymer containing other amounts of the combination of additives of the present invention within the ranges specified. Also, like good results were obtained employing conventional contiuous polymerization apparatus including an evaporator, reactor, flasher and finisher.

Thus, it is seen that the present invention provides numerous advantages. Among these is the imparting of more rapid and deeper dyeing characteristics to nylon-66 type yarn.

As many different embodiments of this invention can be made without departing from the spirit and scope thereof, it is to be understood that the invention is not

What is claimed is:

1. Polyhexamethylene adipamide having incorporated therein about 0.2–2.0 weight percent N-(2-aminoethyl) piperazine and about 3.0–20 weight percent 6-aminocaproic acid.

2. Polyhexamethylene adipamide having incorporated therein 0.4–1.0 weight percent N-(2-aminoethyl) piperazine and 5.0–15 weight percent 6-aminocaproic acid.

References Cited by the Examiner

UNITED STATES PATENTS

| | | | |
|---|---|---|---|
| 2,252,555 | 8/1941 | Carothers | 260—78 |
| 2,324,936 | 7/1943 | Kroeper et al. | 260—78 |
| 2,359,833 | 10/1943 | Faris | 260—78 |

SAMUEL H. BLECH, *Primary Examiner.*

WILLIAM H. SHORT, *Examiner.*

H. D. ANDERSON, *Assistant Examiner.*